United States Patent
Böhler et al.

(10) Patent No.: US 11,831,170 B2
(45) Date of Patent: Nov. 28, 2023

(54) SIGNAL MATCHING APPARATUS IN A SYSTEM FOR INDUCTIVE POWER TRANSMISSION

(71) Applicant: BRUSA Elektronik AG, Sennwald (CH)

(72) Inventors: Lukas Böhler, Wangs (CH); Adrian Immler, Buchs (CH); Richard Knuchel, Altstätten (CH); Martin Erler, Dornbirn (AT)

(73) Assignee: BRUSA Elektronik AG, Sennwald (CH)

( * ) Notice: Subject to any disclaimer, the term of this patent is extended or adjusted under 35 U.S.C. 154(b) by 0 days.

(21) Appl. No.: 17/253,529

(22) PCT Filed: Jun. 24, 2019

(86) PCT No.: PCT/EP2019/066657
§ 371 (c)(1),
(2) Date: Dec. 17, 2020

(87) PCT Pub. No.: WO2020/002224
PCT Pub. Date: Jan. 2, 2020

(65) Prior Publication Data
US 2021/0135500 A1   May 6, 2021

(30) Foreign Application Priority Data
Jun. 29, 2018  (DE) ............. 10 2018 115 875.0

(51) Int. Cl.
*H02J 50/12* (2016.01)
*H02J 50/80* (2016.01)
*H02J 50/90* (2016.01)

(52) U.S. Cl.
CPC .............. *H02J 50/12* (2016.02); *H02J 50/80* (2016.02); *H02J 50/90* (2016.02)

(58) Field of Classification Search
CPC .. H02J 50/80; H02J 50/90; H02J 50/12; H02J 50/005; H02J 50/60
See application file for complete search history.

(56) References Cited

U.S. PATENT DOCUMENTS

| | | | |
|---|---|---|---|
| 3,160,832 A * | 12/1964 | Beitman, Jr. | ............ H03H 7/40 333/17.1 |
| 4,612,669 A * | 9/1986 | Nossen | ................ H04B 1/0458 333/17.3 |

(Continued)

FOREIGN PATENT DOCUMENTS

| | | |
|---|---|---|
| DE | 69324309 T2 | 8/1999 |
| DE | 102014118071 A1 | 1/2016 |

(Continued)

OTHER PUBLICATIONS

English-language translation of the International Preliminary Report on Patentability issued in International Application No. PCT/EP2019/066657 dated Jan. 7, 2021.

*Primary Examiner* — Daniel Kessie
(74) *Attorney, Agent, or Firm* — Hoffmann & Baron, LLP (57) ABSTRACT

A signal matching apparatus for an evaluation circuit for evaluating an electromagnetic signal for operation in an inductive energy transmission system, the apparatus including a signal transmission device, wherein the signal transmission device includes an antenna connection for connecting a receiving antenna, an evaluation connection for connecting the evaluation circuit for the electromagnetic signal, wherein the antenna connection is configured to receive the electromagnetic signal, wherein the signal transmission device is configured to leave the phase of the electromagnetic signal substantially unchanged and wherein the signal transmission device is configured to match the amplitude of the electromagnetic signal to a characteristic prescribable by the evaluation circuit, wherein the evalua- (Continued)

tion connection is configured to provide the electromagnetic signal to the evaluation circuit.

13 Claims, 5 Drawing Sheets

(56) References Cited

U.S. PATENT DOCUMENTS

| | | | |
|---|---|---|---|
| 5,227,803 A | 7/1993 | O'Connor et al. | |
| 8,963,611 B2* | 2/2015 | See | H04B 1/0458 |
| | | | 327/359 |
| 2013/0099807 A1 | 4/2013 | Wheeland et al. | |
| 2014/0071571 A1 | 3/2014 | Tseng et al. | |
| 2015/0194838 A1* | 7/2015 | Won | H02J 7/025 |
| | | | 320/108 |
| 2015/0207333 A1 | 7/2015 | Baarman et al. | |
| 2016/0006290 A1 | 1/2016 | Ho et al. | |
| 2016/0087687 A1 | 3/2016 | Kesler et al. | |
| 2017/0346343 A1* | 11/2017 | Atasoy | H01F 38/14 |
| 2020/0178801 A1* | 6/2020 | Nazari | A61B 5/0031 |

FOREIGN PATENT DOCUMENTS

| | | | |
|---|---|---|---|
| EP | 2868516 A1 | 5/2015 |
| EP | 3091636 A1 | 11/2016 |
| EP | 3103674 A1 | 12/2016 |
| EP | 3319206 A1 | 5/2018 |

\* cited by examiner

SIGNAL MATCHING APPARATUS IN A SYSTEM FOR INDUCTIVE POWER TRANSMISSION

CROSS-REFERENCE TO RELATED APPLICATIONS

The present application is the U.S. National Phase of PCT/EP2019/066657, filed on Jun. 24, 2019, which claims priority to German Patent Application No. 10 2018 115 875.0, filed on Jun. 29, 2018, the entire contents of which are incorporated herein by reference.

BACKGROUND

Field

The invention relates to the technical field of inductive charging. In particular, the present invention relates to a signal matching apparatus and to a method for matching a matchable filter device.

RELATED ART

For electrically charging a purely electric motor vehicle (EV, Electric Vehicle) or a hybrid vehicle (PHEV, Plug-in Hybrid-Electric Vehicle) which is operated with a combination of fuel and electric energy, a system for inductive energy transmission can be used if the charging is to occur in a contactless manner. In such a system, an alternating magnetic field in the frequency range of 25 kHz ... 150 kHz is generated. Here, it must be taken into consideration that, outside of this frequency range, the limit values for the emission of electromagnetic waves are established by internationally valid standards. Indeed, although a magnetic field is used in principle for energy transmission, due to the fact that the magnetic field inherently changes, it is an electromagnetic wave. Because of the slow change of the field strength, the electromagnetic wave used in inductive charging nevertheless has a wavelength of several kilometers.

In order to comply with these limit values for emission, it should be ensured that the alternating magnetic field used for the energy transmission works with a fundamental oscillation in the range 25 kHz ... 150 kHz and contains only very few harmonics. Therefore, filters are used, which to the extent possible remove the interfering harmonics. In addition, in order to comply with the internationally valid standards and guidelines, it must be ensured that energy transmission occurs only if a certain quality of the mutual coupling is achieved, in that a certain orientation of the coupling elements with respect to one another is set, for example, by a positioning system as cited, for example, in the document EP 3 103 674 A1.

Printed document EP 2 868 516 A1 describes a method for closed-loop control of the energy transmitted between two resonators of a system for contactless energy transmission.

As coupling element for the energy transmission, a GPM (Ground Pad Module) with a primary coil is used on the stationary side, and on the vehicle side a CPM (Car Pad Module) with a secondary coil is used. GPM and CPM form a transformer for the coupling and energy transmission. The physical orientation of the coupling elements with respect to one another is measured and set via a positioning signal, for example, RKS (Remote Keyless Entry System). For the energy transmission and the transmission of the positioning signal, different transmission distances and different transmission techniques are used.

By the use of different systems in the vicinity and, in particular, by the use of electric magnetic waves, the systems can interfere with one another.

SUMMARY

Thus, enabling an effective transmission of energy can be considered to be an aim of the present invention.

Accordingly, a switching device, a resonant circuit and a method for switching the switching device are indicated.

The subject matter of the invention is indicated by the features of the independent claims Embodiment examples and additional aspects of the invention are indicated in the dependent claims and the following description.

According to one aspect, a signal matching apparatus for an evaluation circuit for evaluating an electromagnetic signal for operation in an inductive energy transmission system is indicated. This signal matching apparatus includes an antenna connection for connecting a receiving antenna and an evaluation connection for connecting the evaluation circuit for the electromagnetic signal. The antenna connection is configured to receive the electromagnetic signal. The signal transmission device is configured to leave the phase of the electromagnetic signal substantially unchanged and to match the amplitude of the electromagnetic signal to a characteristic prescribable by the evaluation circuit. In addition, the evaluation connection is configured to provide the electromagnetic signal to the evaluation circuit. The prescribable characteristic can influence a frequency response of the signal matching apparatus or influence a resonance frequency of a primary resonant circuit, for example, in order to set a transmission factor.

According to another aspect of the present invention, a method for matching a matchable filter device of a signal matching apparatus is described, the method including exciting the matchable filter device with an excitation pulse, for example, a direct-current pulse, and measuring a phase of the filter with a phase measurement device of the inductive energy transmission system, as well as matching the matchable filter device by connecting and/or disconnecting at least one capacitor and/or array of capacitors to and/or from the filter device.

According to yet another aspect of the present invention, a computer-readable storage medium is provided, in which a program code is stored, which, when executed by a processor, carries out the method for matching the matchable filter device. A control device or a controller can use such a processor.

As a computer-readable storage medium, a floppy disc, a hard disk, a USB (Universal Serial Bus) storage device, a RAM (Random Access Memory), a ROM (Read Only Memory) or an EPROM (Erasable Programmable Read Only Memory) can be used. As storage medium, an ASIC (application-specific integrated circuit) or an FPGA (field-programmable gate array) can be used, as can an SSD (Solid-State-Drive) technology or flash-based storage medium. Likewise, as storage medium, a web server or a cloud can be used. As a computer-readable storage medium, one can also consider a communication network such as, for example, the Internet, which may allow downloading of a program code. A radio-based network technology and/or a cable-bound network technology can be used.

According to yet another aspect of the present invention, a program element is created, which, when executed by a processor, carries out the method for matching a matchable filter device.

According to yet another aspect of the present invention, the signal matching apparatus includes a surge protection device, wherein the surge protection device is matched to an operating frequency of the inductive energy transmission system, in order to bleed off a high voltage generated by the inductive energy transmission system.

Thus, for example, radiation can be bled off into a positioning system which works at a frequency other than that of the energy transmission system, and wherein the radiation has a harmful high voltage.

According to another aspect of the present invention, the signal transmission device moreover includes a damping device, wherein the damping device is configured to match the amplitude of the electromagnetic signal to the characteristic prescribable by the evaluation circuit and to form a voltage divider with the surge protection device. For example, the damping device is switchable between a near-field characteristic and a far-field characteristic of the electromagnetic signal. In another example, the damping device includes a capacitive damping element. For example, the capacitive damping element together with the surge protection device forms a capacitive voltage divider and/or a capacitive damping element.

According to another aspect of the present invention, the damping device is configured to dampen signals that are above and/or below the frequency of the electromagnetic signal more strongly than signals that are at the frequency of the electromagnetic signal.

According to yet another aspect of the present invention, the signal transmission device moreover includes a matchable filter device. The matchable filter device can be matched so that the phase of the electromagnetic signal remains substantially unchanged, and wherein the matchable filter device is configured to compensate for a deviation of the components involved in the filter structure. For example, the matchable filter device for matching the phase and/or for compensating for the deviation of the components uses a phase measurement device of the inductive energy transmission system, for example, a zero-crossing measurement device.

According to another aspect of the present invention, the electromagnetic signal is a positioning signal, for example, a keyless entry system signal.

According to another aspect of the present invention, the evaluation circuit is configured to evaluate an amplitude and/or phase of the electromagnetic signal.

BRIEF DESCRIPTION OF THE DRAWINGS

Below, additional example embodiments of the present invention are described with reference to the figures.

DETAILED DESCRIPTION

The representations in the figures are diagrammatic and not true to scale. In the following description of FIG. 1 to FIG. 10, the same reference numerals are used for the same or equivalent elements.

In this text, the words "capacitor" and "capacitance" as well as "coil" or "inductor" or "inductance" are used synonymously and should therefore not be interpreted in a limiting manner unless otherwise indicated. Moreover, the words "energy" and "power" are used equivalently and should not be interpreted in a limiting manner unless otherwise indicated.

Figure 1:
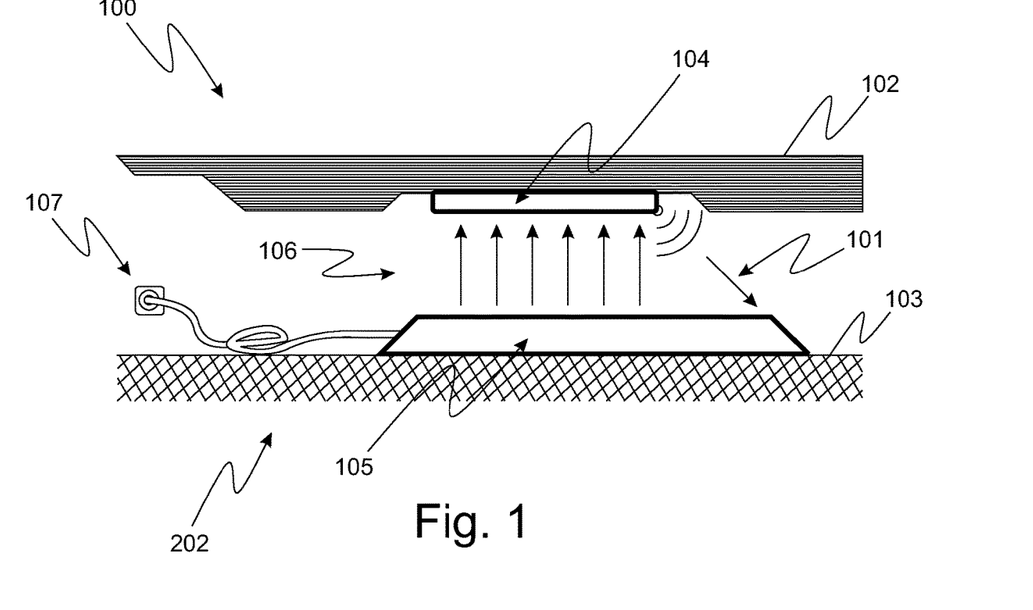
FIG. 1 shows an inductive charging system according to an example embodiment of the present invention.

FIG. 1 shows an inductive charging system 100 or system 100 for energy transmission according to an example embodiment of the present invention. Here, a side view of a system for contactless charging of an electric vehicle is represented. Below the vehicle chassis 102, a Car Pad Module (CPM) 104 is located, which is used for supplying the vehicle 102 with current. For the transmission of energy, a magnetic field 106 is used, which inductively provides the energy from a Ground Pad Module (GPM) 105 stationarily mounted on a ground surface 103. The energy necessary for charging is tapped from the main connection 107 which can be either alternating current (AC) or direct current (DC). For the communication between CPM 104 and GPM 105, a separate connection 101 is used, which can use, for example, a wireless protocol such as WLAN (Wireless LAN) or NFC. This connection can be used as feedback channel 101 or as communication channel 101, via which CPM 104 and GPM 105 can exchange data. Both the magnetic field for the energy transmission 106 and also the radio signal 101 are electromagnetic waves which, however, have different frequencies.

Figure 2:
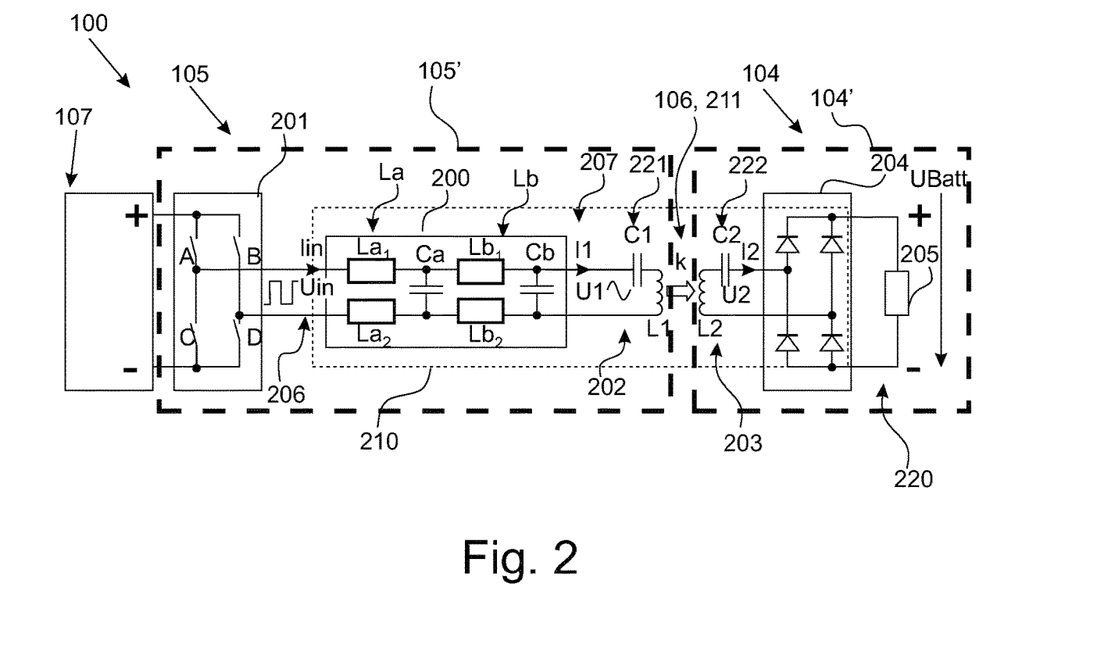
FIG. 2 shows a block circuit diagram of an inductive charging system according to an example embodiment of the present invention.

In FIG. 2, a block circuit diagram of an inductive charging system 100 according to an example embodiment of the present invention is represented. A system for inductive energy transmission is considered, which can be used for contactless charging of an electric vehicle. In such a system, an alternating magnetic field 106 in the frequency range of, for example, 25 kHz . . . 150 kHz is generated. Here, it must be taken into consideration that, outside of this frequency range, the limit values for the emission of electromagnetic waves are established by internationally valid standards. In order to comply with these limit values, it is crucial that the alternating magnetic field 106 works with the fundamental oscillation in the range 25 kHz . . . 150 kHz and contains very few harmonics.

But the efficiency of the power transmission, on the other hand, should be as high as possible, and therefore, by means of electronic switches within an inverter 201, for example, by means of MOSFETs, IGBTs, a square-wave signal with the fundamental frequency of the alternating magnetic field is generated, because this results in very low losses. However, the square-wave signal contains considerable harmonics. These harmonics can be filtered out very satisfactorily with a filter 200, for example, an LC filter 200. The filter 200 here can be designed differently. For example, in FIG. 2, a $4^{th}$ order filter 200 is represented, but other arrangements of capacitors and coils are also possible. The input current and the input voltage $U_{in}$ are at the input 206 of the filter 200. The filter 200 includes two parallel-connected input coils $La_1$ and $La_2$ and the filter input capacitor Ca as well as the parallel-connected output coils $Lb_1$ and $Lb_2$ and the filter output capacitor Cb. Instead of the two series-connected input coils $La_1$ and $La_2$, a single input coil La can also be used. Instead of the two series-connected output coils $Lb_1$ and $Lb_2$, a single output coil Lb can be used.

The input coils $La_1$ and $La_2$ are connected directly to the output of the inverter 201. Here, directly can mean that no additional component is connected in between. A series-connected capacitor here is not intended to make a direct connection into an indirect connection. The word "directly" can be used, in particular, in order to express that connection points of corresponding components coincide and/or have the same potential. The output coils $Lb_1$ and $Lb_2$ at the output 207 of the filter 200 are directly connected to the coils $La_1$ and $La_2$ and to the primary resonant circuit 202. The primary resonant circuit 202 is supplied with the voltage U1 and the current I1 or IL which originated from the alternating current generated by the inverter 201. Due to the filtering effect of the filter 200, the primary current I1 and the primary voltage U1 have a sinusoidal curve.

The primary resonant circuit 202 includes the primary resonance coil L1 or primary coil L1 and the primary resonance capacitor C1 221. The primary resonant circuit 202 converts the current I1 and the voltage U1 into the alternating magnetic field 106. The alternating magnetic field 106 couples with a coupling factor k into the secondary resonant circuit 203 and transmits the energy from the primary circuit through a resonant and inductive energy transmission to the secondary circuit 203.

The secondary resonant circuit 203 includes the secondary resonance coil L2 or secondary coil L2 and the secondary resonance capacitor C2 222. Since the secondary resonant circuit 203 is set to the resonance frequency of the primary resonant circuit 202, the secondary resonant circuit 203 is excited by the magnetic field 106 to an oscillation to the point that the secondary current I2 and the secondary voltage U2 result. The latter are supplied to the rectifier device 204 or the rectifier 204 which can provide at its output 220 a DC voltage to a load 205, for example, to a battery 205, an intermediate circuit 205, a traction circuit 205 or an output-side HV-DC 205 on the CPM 104 side.

The inductive charging system 100 is supplied via a direct current source 107 or an input-side HV-DC (High Voltage-Direct Current) or via an alternating voltage 107.

The energy transmission system 100, for example, an ICS system 100, includes a base station 105 or GPM 105, a remote device 104 or CPM 104, wherein the base station 105 and the remote device 104 can be coupled loosely to one another via an inductive coupling or the feedback channel 101. In an appropriate positioning of the CPM 104 with respect to the GPM 105, a loose coupling can be assumed.

The base station 105 or GPM 105 includes the primary circuit 202, and the remote device 104 or CPM 104 includes the secondary circuit 203. The primary circuit 202 includes the coil L1, and the secondary circuit includes the coil L2.

When the coils L1 and L2 are brought close to one another, the magnetic fields 106 generated by the coils can pass through the respective other coil L1, L2. The portion of the magnetic field which passes through the respective other coil L1, L2 forms the inductive coupling with coupling factor k. This coupling forms a loosely coupled transformer 211. The portion of the magnetic field 106 which lies outside of the respective other coil L1, L2 forms a stray capacitance. The smaller the portion of the stray capacitance formed is, the higher the coupling factor k is. However, due to the mobility of the GPM 105 and CPM 104 with respect to one another, a transformer including a core in which the coupling factor k is substantially constant cannot be formed, and, in the case of the loosely coupled transformer, the coupling factor is variable and dependent, for example, on the relative position of the GPM 105 and CPM 104 with respect to one another.

The functional components of the GPM 105 are combined substantially in the primary function block 105', and the functional components of the CPM 104 are substantially combined in the secondary function block 104'.

Figure 3:
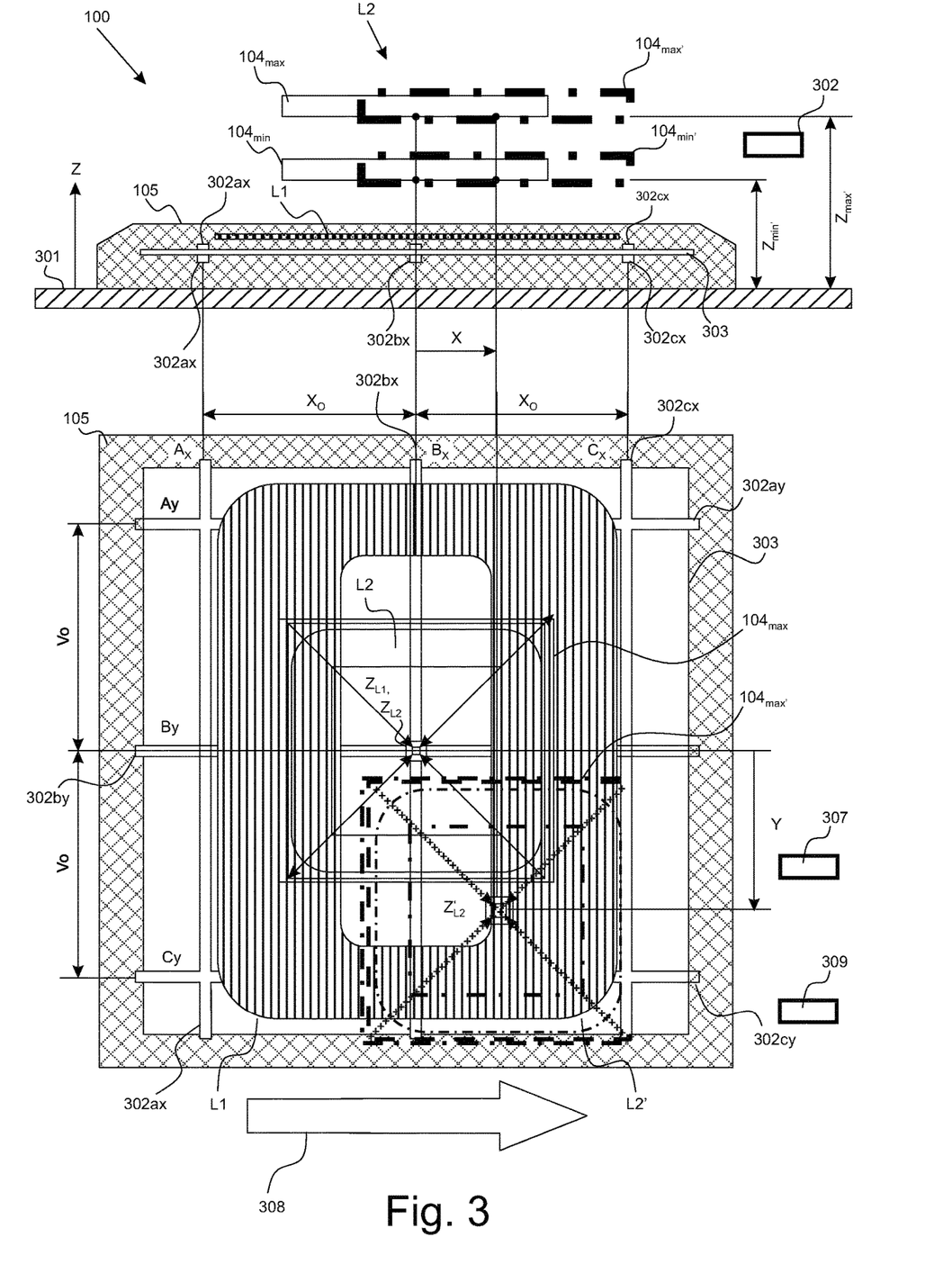
FIG. 3 shows a side view and a top view of a CPM and a GPM in different orientations with respect to one another according to an example embodiment of the present invention.

FIG. 3 shows a side view and a top view of the CPM 104 and a GPM 105 in different orientations with respect to one another according to an example embodiment of the present invention. The two transmission elements 104, 105 or the GPM 105 and the CPM 104 are, as part of a system 100 for inductive energy transmission, in mutually offset position $104_{min}$, $104_{max'}$ and in precisely coaxial position $104_{min}$, $104_{max}$ at different heights Z. One of the transmission elements 105 should be associated with the primary portion of the energy transmission system and is positioned, for example, in the case of inductive charging arrangements for at least partially electrically operated vehicles, on or in the ground surface 301 in the area of a charging station, a garage for the vehicle, etc. When a vehicle is in the charging position, the primary coil L1 of the GPM 105 should be precisely coaxially under the typically smaller secondary coil L2 of the second receiving transmission element 104, $104_{max}$ or CPM 104, $104_{max}$ which is mounted on the vehicle to be charged (not shown in FIG. 1) and which, for supplying the energy wirelessly received by the CPM $104_{max}$, is connected to its traction battery. The energy for charging the batteries of the vehicle is here transmitted magnetically-inductively from the GPM 105 to the CPM 104, $104_{max}$, wherein this transmission becomes more effective the more precisely the coils L1, L2 are positioned with respect to one another.

In order to ensure the most coaxial position possible of the coils L1 to L2, the energy transmission system 100 is provided or connected with a positioning system 302, 302ax, 302bx, 302cx, 302ay, 302by, 302cy, 307 which uses a positioning signal (POS). The positioning system is configured so that it can or even automatically bring about the assuming of a position with good orientation of the coils L1, L2 with respect to one another in order to achieve a good coupling of the coils L1, L2.

Independently of how the relative position of the coils L1, L2 with respect to one another is displayed, signaled or if need be evaluated for the automatic steering of the vehicle into the charging position, the determination of the position of the secondary coil L2 over the center of the primary coil L1 is a prerequisite for such positioning assistance. For the positioning, the charging system 100 is configured to use an inductive method configured to use portions of the charging system 100 which are in any case present for the formation of the magnetic circuit for the energy transmission. For this purpose, in the positioning process, the secondary winding L2 is excited at a frequency of approximately 130 kHz, in particular, 125 kHz, and thus acts as transmission coil in the CPM 104 for the positioning system 302, 302ax, 302bx, 302cx, 302ay, 302by, 302cy, 307.

The GPM 105 which includes the primary coil L1 is equipped with a total of 6 "solenoid windings" 302ax, 302bx, 302cx, 302ay, 302by, 302cy which are used as measurement coils or positioning signal receiving devices 302ax, 302bx, 302cx, 302ay, 302by, 302cy. Said solenoid windings are arranged around ferrite components 303 of the GPM 105, in particular, around a ferrite shielding 303 which shields the electronic components of the primary portion from the primary coil L1. For a precise position determination, in each case 3 measurement coils are oriented in orthogonal directions, wherein the directions are referred to as x direction and y direction. The 3 measurement coils are arranged symmetrically with respect to the center of symmetry $Z_{L1}$ of the coil L1 with defined spacing $x_0$ and $y_0$. Another number and other arrangements of the positioning windings are also conceivable.

Depending on the position of coil L2 with respect to L1, the field generated by the secondary winding L2 by means of the positioning system 302 brings about different induced voltages through the individual windings 302ax, 302bx, 302cx, 302ay, 302by, 302cy. By means of an evaluation unit 307 or control unit 307 of the positioning system in the GPM 105, using appropriately designed electronics, the X/Y position of the CPM 104 with respect to the GPM 105 can be determined from these voltages. The GPM 105 is located on the ground surface 301 under the vehicle, and the CPM is mounted, for example, under the vehicle. The X/Y position of the CPM 104 with respect to the GPM 105 can be determined independently of the height Z, i.e., independently of the vertical spacing of the coils L1, L2 perpendicular to the planes thereof. The directions X and Y and the height Z are represented as arrows in FIG. 1. The driving direction of the vehicle can be in X direction, as represented by arrow 308.

The system 105 of the charging station or of another primary portion usually communicates with the system 104 of the vehicle via wireless connections 101, for example, by radio, WLAN or Bluetooth. Thereby, the data determined in the evaluation unit 307 on the relative position of the energy transmission coils L1, L2 with respect to one another can be transmitted to the vehicle and there can be provided via interfaces, for example, via a field bus, in particular, a CAN bus (Controller Area Network), to a display or similar representation unit and made available to the driver.

The measurement magnetic field (not represented in FIG. 1), instead of being generated by the secondary winding L2 of the CPM 104 mounted, for example, on the vehicle, could be generated by a separate transmission antenna. This separate antenna could also be provided as a supplement to a CPM 104 which itself generates a measurement magnetic field and could be integrated in this CPM 104. This transmission antenna can be designed, for example, in the form of a rod antenna or as a solenoid antenna and if need be can also be mounted as external transmission antenna on the vehicle outside of the CPM 104. Optionally, a coil around ferrite elements of the CPM 104 would also be conceivable as transmission antenna.

In the position determination with the assistance of the positioning system, by means of at least one of the voltage measuring arrangement connected to the measurement coils 302ax, 302bx, 302cx, 302ay, 302by, 302cy, which can be integrated in the evaluation unit 307 or connected upstream thereof, the voltages occurring on the coils 302ax, 302bx, 302cx, 302ay, 302by and 302cy are determined as a function of the position, in particular, as a function of the temporal offset between the centers of symmetry $Z_{L1}$ and $Z_{L2}$ or $Z_{L2}$ of the coils L1, L2 of the CPM 104 and GPM 105. This measurement magnetic field is generated by the coil L2. In the case of a greater distance between the CPM 104 and the GPM 105, the effect of the coil L2 can be reinforced by an external antenna. In the case of decreasing distances, the position determination can be carried out with the assistance of the measurement magnetic field which is generated by the coil L2 alone, without the use of the external antenna.

Thus, for inductive and/or contactless transmission of electrical energy to a vehicle from GPM 105 to the CPM 104, each unit contains a main coil L1, L2. The main coil on the energy-supplying side is also referred to as primary coil L1 and the main coil on the energy-receiving side is referred to as secondary coil L2. The two main coils are coupled via a resonant magnetic field 106 which is generated by coil electronics. Via this magnetic field, the energy is as a rule transmitted from the GPM 105 to the CPM 104.

In addition to the system for positioning 302, 307 POS, the energy transmission system 100 can include additional systems and/or sensors. For example, in addition to the measurement coils 302ax, 302bx, 302cx, 302ay, 302by, 302cy, sensors of a FOD system for the detection of electrically conducting or magnetically acting foreign bodies or of an LOD system for the detection of organic objects can be present. All these systems can use electromagnetic waves and/or fields in order to perform their function.

Since the resonant magnetic field used for energy transmission is substantially an electromagnetic wave and/or an electromagnetic field, a mutual influencing of components can occur, since, in the passive state, generators of electromagnetic waves themselves can represent interferences for other electromagnetic systems, in that they are excited to oscillation by an electromagnetic wave acting on them from outside and themselves become a transmitter which, however, usually acts as a jammer of the signal itself.

The main coil L1 or energy transmission coil L1 requires a high quality. By additional electronic components such as inverters with diode paths and capacitors, resonant circuits of high quality can be formed, which influence the signals of the LOD, FOD and POS systems, 302, 307 and thus can lead to a limitation of the quality and performance of the LOD, FOD and POS systems, 302, 307. In the case of a positioning system 302, 307 POS, a second transmitter can be formed, since the primary resonance circuit 202 can be excited to oscillation. In addition, a magnetic coupling between the main coil L1 and the measuring or receiving coils 302ax, 302bx, 302cx, 302ay, 302by, 302cy of the positioning system 302, 307 can occur. By this magnetic coupling, via the law of electromagnetic induction, signals of the sensors in other physical positions in space can be transmitted by induction of the measuring currents or by induced currents. Sensors in these other physical positions then no longer measure only the useful signal of the transmitter of the signal but, in addition, also measure superpositions of this useful signal with the signals originating from sensors in the other positions.

The frequencies are thus in fact far apart and no mutual interferences of the systems should occur. However, component tolerances can ensure that reactions of individual circuits occur, although the signals are in other frequency ranges and not intended for them at all. This can lead to destruction of the components, since the systems work with very different voltages. While POS, LOD, FOD works with voltages in the μV range, the energy transmission system, on the other hand, works with approximately 6000 V in a substantially higher voltage range and could destroy the electronics of other systems.

Figure 4:
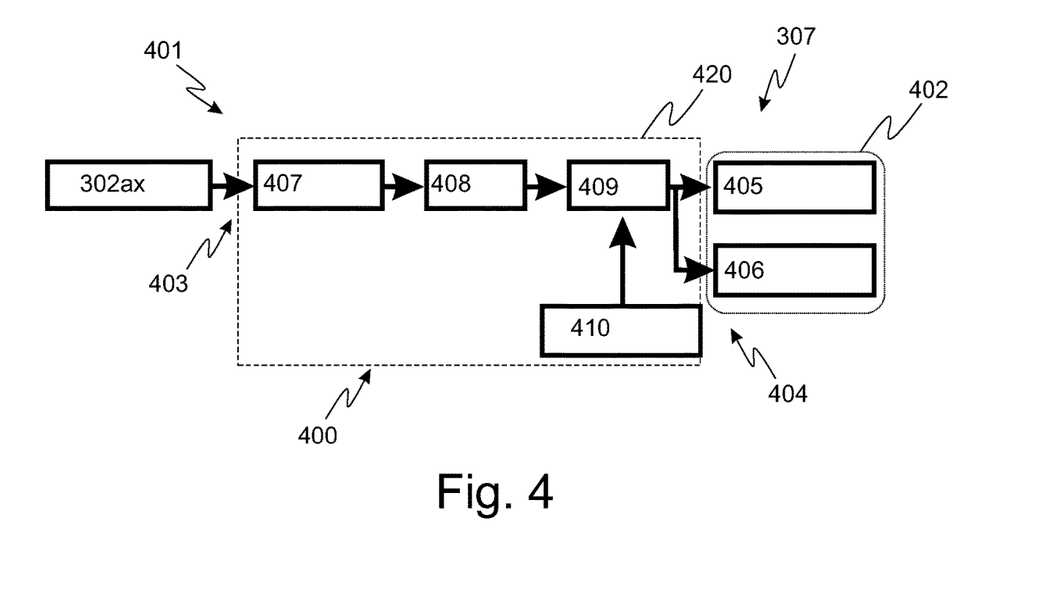
FIG. 4 shows a diagrammatic block circuit diagram of the receiving structure of a positioning system according to an example embodiment of the present invention.

FIG. 4 shows a diagrammatic block diagram of the receiving structure 401 of a positioning system 302, 307 according to an example embodiment of the present invention. The POS receiving structure 401 substantially includes three function blocks 302ax, 400, 402.

A positioning system 302, 307 can substantially provide six receiving antennas 302ax, 302bx, 302cx, 302ay, 302by, 302cy. Of these antennas, only one antenna 302ax is considered below, since the design of the other antennas 302bx, 302cx, 302ay, 302by, 302cy is substantially the same.

Via the receiving antenna 302ax, an electromagnetic signal, for example, a positioning signal POS is received. Although the description substantially discusses only one POS signal, it applies to every possible electromagnetic receiving device which is operated in the vicinity of a strong magnetic field 106.

The receiving antenna 302ax is connected to the antenna connection 403 of a signal matching apparatus 400. A signal received by the receiving antenna 302ax is intended to be further transported to the control device 307 with the signal evaluation circuit 402 or evaluation circuit 402 for evaluating an electromagnetic signal for the operation in an inductive energy transmission system. The evaluation circuit 402 is connected to the evaluation connection 404 of the signal matching apparatus 400. The evaluation circuit 402 includes the amplitude evaluation device 405 for evaluating an amplitude of the received signal and/or of data in the positioning signal and the phase evaluation device 406 for evaluating a phase of the received signal. The evaluation of the amplitude can be used for the data evaluation and/or distance evaluation; the phase can be used for the position evaluation.

The signal transmission device 420 of the signal matching apparatus 400 furthermore includes an surge protection device 407, a damping device 408 and a matchable filter device 409. By means of an excitation device 410, the matchable filter device 409 can generate an excitation pulse and/or test pulse, for example, a direct current pulse for the matchable filter device 409.

The surge protection device 407 is matched to an operating frequency of the inductive energy transmission system 100, for example, 85 kHz, and for this purpose it is provided to bleed off a high voltage generated by the inductive energy transmission system, which is possibly incorrectly coupled into the antenna 302ax. During the energy transmission, in the POS antenna 302ax, 1000 V and higher can be induced, since the POS antenna 302ax can include a POS winding which is wound around a ferrite 303, and therefore the field lines generated by the main coil L1 can completely pass through the windings 302ax and generate a voltage. But this induced voltage is too high for the components of the evaluation circuit, so that they have to be protected against destruction.

The signal transmission device 420 is configured to leave the phase of the electromagnetic signal substantially unchanged. The phase is evaluated by the evaluation circuit 402 in order to carry out a position determination.

In addition, the signal transmission device 420 is configured to match the amplitude of the electromagnetic signal to a characteristic prescribable by the evaluation circuit 402 and/or the evaluation unit 307, in order, for example, to be able to take into consideration different near-field or far-field signal strengths.

On the evaluation connection 404, the received electromagnetic signal, for example, the positioning signal POS, can be transmitted to the evaluation circuit 402.

Figure 5:
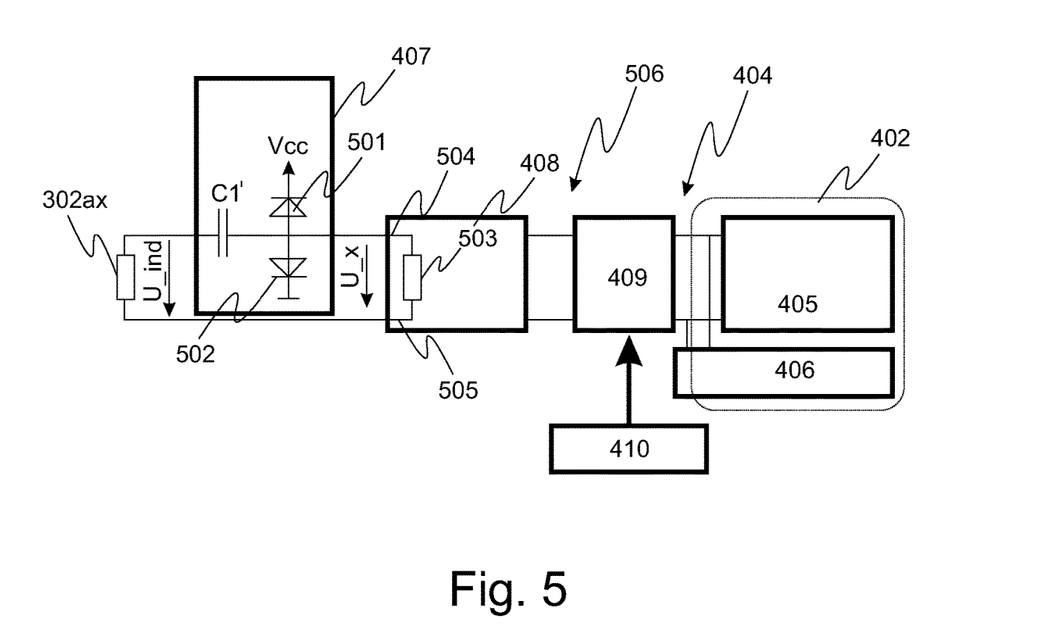
FIG. 5 shows a circuit configuration for the surge protection device according to an example embodiment of the present invention.

FIG. 5 shows a circuit configuration for the surge protection device 407 according to an example embodiment of the present invention. Here, the antenna 302ax is connected to a capacitor C1' and to a damping element 503 of the damping device 408. The damping element 503 for damping matching is connected to the antenna 302ax. On the damping element, the voltage U_x drops. The antenna 302ax receives the voltage U_ind. In addition, a first diode 501 connects a connection of the capacitor C1' to a supply voltage $V_{CC}$, and a second diode connects the same connection of the capacitor C1' to a reference potential.

Figure 6:
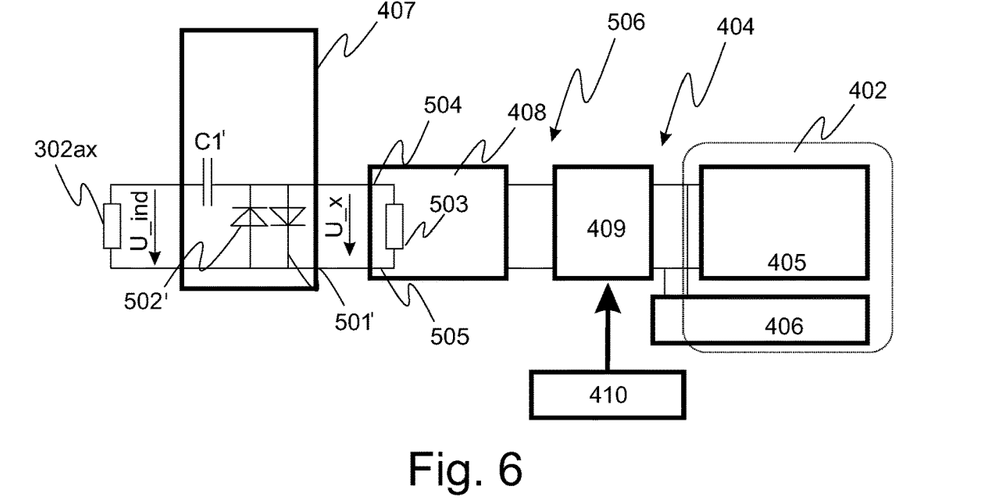
FIG. 6 shows an alternative circuit configuration for the surge protection device according to an example embodiment of the present invention.

FIG. 6 shows an alternative circuit configuration for the surge protection device 407' according to an example embodiment of the present invention. The design of the circuit from FIG. 6 corresponds substantially to the design from FIG. 5. However, the first diode 501' and the second diode 502' are connected antiparallel, so that the anode of the first diode 501' is connected to the first input 504 of the damping device 408 and to a connection of the capacitor C1, and the cathode is connected to the second input 505 of the damping device 408. The anode of the second diode 502' is connected to the second input 505 of the damping device 408, and the cathode is connected to the first input 504 of the damping device 408 and to a connection of the capacitor C1. None of the diodes 501', 502' is connected to the supply voltage or to the reference potential.

Shown in FIGS. 5 and 6 are two embodiment examples of clamping the high voltage U_ind which can arise in the antenna 302ax.

According to FIG. 5, the capacitance C1' of the high voltage protection circuit 407 for the induced voltage U_ind forms an impedance which can be calculated according to the following formula $$Z_{longitudinal} = \frac{1}{j\omega_{magneticfield} C1}.$$

Z_longitudinal is the longitudinal impedance, and ω_magnetic field corresponds to the frequency of the interfering radiation, for example, 85 kHz.

Since the input impedance 503 of the damping device 408 on which the voltage U_x is applied is relatively high, the longitudinal impedance Z_longitudinal of the capacitor C1' forms a voltage divider with the input impedance Z_x 503 of the damping circuit 408 and the downstream circuit portions. As soon as the input voltage U_x of the damping circuit 408

$$U_x = \frac{U_{ind} * Z_x}{Z_x + Z_{longitudinal}}.$$

exceeds the supply voltage $V_{CC}$ plus the diode longitudinal voltage ($V_{CC}$+Vlongitudinal), the current induced in the antenna 302ax drains off through the diodes 501, 502 into the supply $V_{CC}$. Then C1', the diodes and the supply must be designed so that the flowing current I_during_charging=(U_ind diodes longitudinal voltage−$V_{CC}$)/ Z_longitudinal, i.e., the current which flows during the charging, does not cause any failures. The current I_during_charging is defined by C1 and the induced voltage U_ind.

Surge protection can be necessary, since, in an inductive charging system 100, a positioning system 302, 307 is used in the vicinity of extremely strong magnetic fields 106. The magnetic fields 106 of the energy transmission therefore can destroy the sensitive receiving circuits 402 of the positioning determination sensors 302ax, since high voltages U_ind are induced.

Instead of clamping diodes which from a certain signal strength on represent a low-ohm parallel path to the sensitive measurement circuit, in cooperation with a resistive impedance, for example, a resistor, a PTC, a semi-conductor component, etc., for current limitation, the surge protection device 407 provides substantially not a resistive element but rather a capacitive element. Thus, this resistive current limitation element can be prevented from either causing high losses of several watts during the inductive charging or resulting in an undesirably high signal damping during the vehicle positioning. A capacitive element can also avoid a complex actuation circuit and costs which would be necessary when using resistive current limitation elements with variable impedance, for example, MOSPET.

As current-limiting element, it is thus provided to use a non-resistive element, i.e., an element which only causes apparent power. In other words, as current-limiting element, one should use an element with a complex impedance, the real part of which is zero, and the imaginary part of which is not equal to zero, i.e., $Re\{Z\}=0; Im\{z\}\neq 0-$. As a result of the elimination of the high losses, the impedance of the non-resistive current limitation element, for example, the capacitance, can be greatly reduced, so that this element cannot be destroyed by the high voltages and generates low power loss.

Due to the occurrence of signals of different strengths, for example, in a near field or far field, signal transmission device 400 should be configured so that the reception sensitivity can be switched in order to limit the dynamic range of the signal on the analog-digital converter (ADC) of the evaluation device 402 to a value such that the entire dynamic range is used. However, the switching of the damping should not excessively increase the bandwidth of the filter structure 409, since other interferences can no longer be sufficiently suppressed.

It should be avoided that an LC resonant circuit is damped by means of a connectable resistor of resistive type, in order to avoid the occurrence an undesirably great bandwidth increase. The bandwidth increase can have a negative influence particularly on the phase response, so that the position can no longer be determined from the positioning signal or is negatively affected.

In addition, the use of a connectable capacitance should also be avoided, in order to achieve, based on the principle of the capacitive voltage divider, a lowering of the signal level, because a resonance frequency shift of the filter 409 could occur, which in turn would lower the quality of the positioning signal and make the position determination imprecise.

On order to change the damping, the signal matching apparatus 400 provides for connecting and/or disconnecting a capacitance Cd to/from a series resonant circuit 701. Here, a series resonant circuit already present in an energy transmission system or in a positioning system can possibly have a dual use. The capacitance is arranged at a certain site of the series resonant circuit 701 which is present in any case. With an appropriate design of the participating components, a damping can thus be achieved substantially without an undesirably great bandwidth increase and without shift of the resonance frequency.

Figure 7:
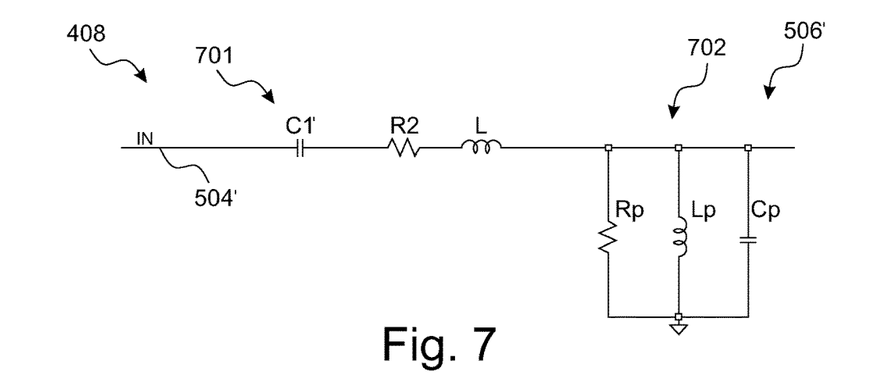
FIG. 7 shows a series resonant circuit without connected damping device according to an example embodiment of the present invention.

FIG. 7 shows a series resonant circuit 701 without connected damping device according to an example embodiment of the present invention. The series resonant circuit 701 includes the capacitance C1', the resistor R, and the coil L, and is connected to a parallel resonant circuit 702 with the resistor Rp, the coil Lp and the capacitor Cp. For example, the damping device 408 contains such a series resonant circuit 701. C1' in FIGS. 7 and 8 corresponds to C1' from FIG. 6. The series resonant circuit 701 receives a signal at the input 504' from an antenna 302ax, not shown in FIG. 7. The signal is conveyed via the parallel resonant circuit and transmitted at the output 506' in the direction of an evaluation unit 402.

Figure 8:
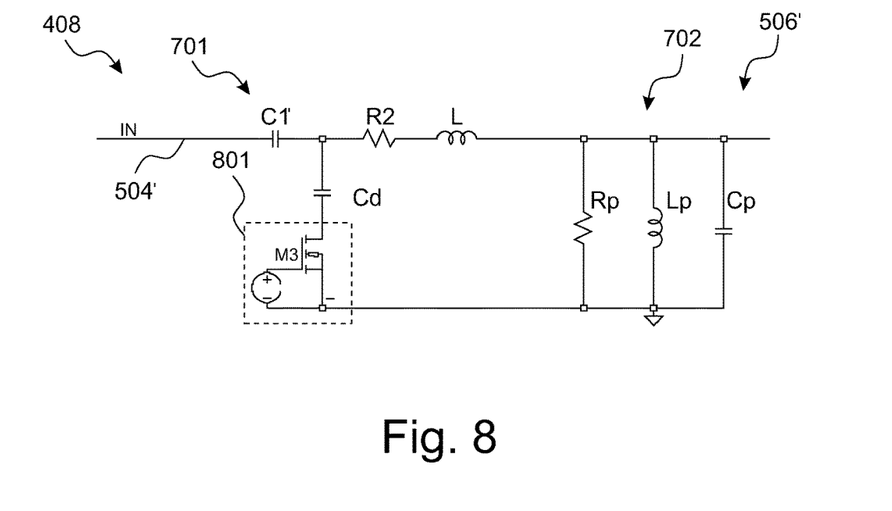
FIG. 8 shows a series resonant circuit with connected damping device according to an example embodiment of the present invention.

FIG. 8 shows a series resonant circuit 701 with connected damping device 801 according to an example embodiment of the present invention. This series resonant circuit substantially corresponds to the resonant circuit from FIG. 7. However, the additional capacitor Cd is connected via the damping switching device 801 which includes a switch and an actuation source, represented as voltage source in the diagram of FIG. 8. The damping switching device 801, like the parallel resonant circuit 702, is connected to the reference potential.

In the manner of switching represented in FIG. 8, damping is active in order, for example, to take into consideration a near field.

Figure 9:
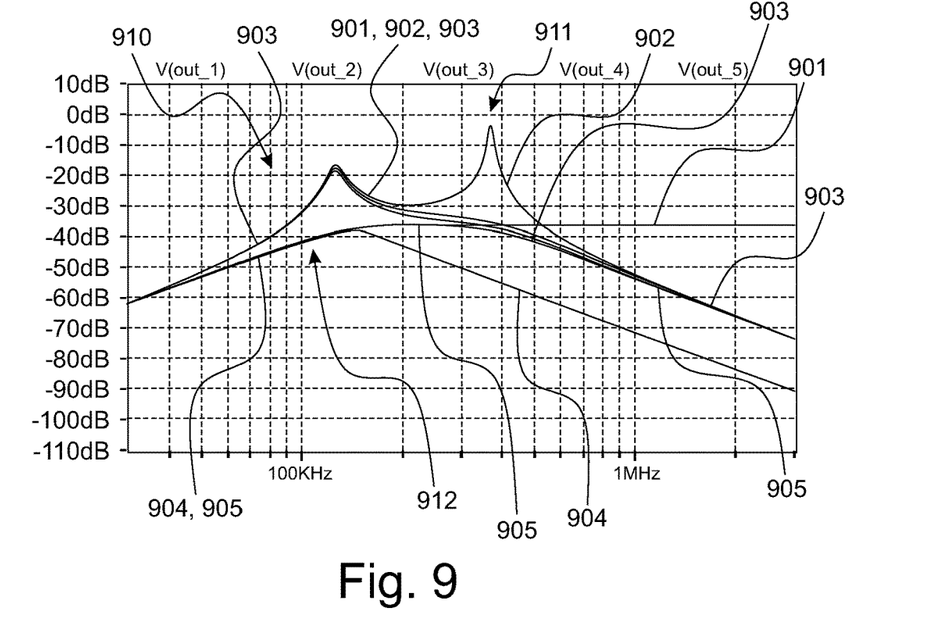
FIG. 9 shows a frequency response at different damping devices according to an example embodiment of the present invention.

FIG. 9 shows a frequency response of different damping devices according to an example embodiment of the present invention. Here, on the abscissa, the frequency is represented on a logarithmic scale. On the ordinate, the damping in dB is represented.

C1' is the non-resistive current limitation element. The clamping diodes 501, 502, 501', 502' are not drawn in FIGS. 7 and 8. They play a secondary role for the frequency response analysis. Curve 901 shows a curve which would result if neither the coil L nor the resistor R2 were used in the series resonant circuit 701. The curve of the curve 901 shows that an undesired resonance 910 at the resonance frequency 125 kHz is in fact formed, which is used for the POS signal, for example, as keyless entry system signal. However, a minor filtering effect is shown for frequencies above 125 kHz, wherein the curve 901 does not drop and remains at approximately the same level. This is justified in that the current limiting capacitor together with the C1 of the resonant circuit 701 forms a capacitive voltage divider which determines the maximum damping at high frequencies.

The curve 902 shows the frequency response of a circuit as in FIG. 7 but without R2, in which an inductance L is inserted in the signal path in order to better dampen high-frequency interferences. Although a damping of higher frequencies occurs, this inductance forms a series resonant circuit with current limiting capacitance C1', so that a new undesired resonance site 911 is formed, at approximately 370 kHz.

The curve 903 shows the frequency response at the output 506' of the circuit from FIG. 7. It can be seen that the undesired resonance site 911 is eliminated by means of the resistor R2 series connected with L and C1'. This circuit can thus be used for a far-field damping, if the positioning signal POS is weak.

The curve 904 shows a curve which results with a connectable capacitance Cd according to FIG. 8. Here, the series resonant circuit 701 which is present in any case in an energy transmission system 100 has a dual use, in order to eliminate the problem of the undesirably high bandwidth. For this purpose, the switch 801 is placed in such a manner that it switches the capacitor Cd between resistor R2 and capacitor C1'. Since, instead of a resistive element or resistor, the capacitor Cd is used, in the case of a skillful selection of the capacitance of this capacitor, the capacitor Cd reduces the resonance frequency of the series resonant circuit 701 to the desired extent, so that the resulting damping minimum 912 drops precisely to the signal frequency at approximately 125 kHz. By appropriate selection of Cd, the damping can be selected so that the signal strengths on the evaluation circuit are in a desired range.

By this selection of the installation site and of the corresponding dimensioning, as well as by the selection as resistive element, high-frequency interferences can again be clearly more satisfactorily suppressed (20 dB). At the same time, the signal level is reduced as desired. This circuit can thus be used for near-field damping, if the positioning signal POS is particularly strong. The resistor R2 could also be relocated or inserted at another site.

The curve 905 shows the curve of a filter structure, in which a connectable resistor is incorporated at a site other than Cd, for example, between the coil L and the parallel resonant circuit 702. This connectable resistor in fact increases the signal damping if necessary, for example, if a near field is to be used, as can be seen in the peak 912 which is at a lower level compared to 910. However, the resistor reduces the quality of the parallel resonant circuit 702 and thus increases its bandwidth and does not decrease as strongly as curve 904 at higher frequencies. As can be obtained from the curve 905, the signal damping at 125 kHz has been increased as desired, but suppressed interference signals up to approximately 500 kHz are only low because of the large bandwidth thereof.

Consequently, the arrangement according to FIG. 7 and FIG. 8 ensures a damping switching between peaks 910 and 911, without excessive bandwidth increase or resonance frequency shift.

In order to be able to filter out interferences, bandpass filter structures are provided in the filter 409. These are subject to component variance, which leads to biasing of the amplitude measurements and especially phase measurements by the amplitude evaluation device 405 and the phase evaluation device 406. Here the capacitance and/or inductance of an LC resonant circuit are designed to be adjustable, for example, by connecting and disconnecting capacitors.

However, there is also a temperature dependence of the filter elements, so that a single adjustment in the manufacturing line is not sufficient, i.e., the energy transmission system 100, in particular, its positioning system 302, 307, 401, should be able to autonomously carry out a resonant circuit adjustment, if needed, for example, before each vehicle positioning process.

For the adjustment, a signal zero-crossing detector which is present in any case in a positioning system for the signal phase measurement has a dual use, in that these signal zero-crossing detectors are also used in order to measure the oscillation duration of the natural resonance of the LC resonant circuits 701, 702.

At the beginning of this measurement, the LC resonant circuits 701, 702 are sufficiently excited, for example, by connecting and disconnecting a direct current source which is connected to the LC resonant circuit 701, 702 and by causing the LC resonant circuit 701, 702 to oscillate. In this manner, a filter can be matched or tuned, in order to compensate for the detected interferences.

The matching of a filter can be used, for example, for a reception filter, for example, a reception noise filter. In order to reduce reception noise, a filter, in particular, a bandpass filter, is placed on the evaluation circuit 402. Thereby, interferences can be filtered out. The filter should be of lowest possible quality, since otherwise the signal cannot decay and a data evaluation of the positioning signal is made more difficult. The data evaluation 405 can decode content in a positioning signal, in order to arrive at data and in order to work in parallel with the amplitude evaluation 405. The quality Q should be between 2 and 100. Since the filter structure contains components which are subject to variance, the filter must be matched.

A resonant circuit of high quality has a sharp phase shift at the resonance frequency. A resonant circuit of low quality, on the other hand, has a broader phase shift. The broad phase shift could ensure that the phase information could no longer be satisfactorily reconstructed with the phase evaluation device 406, and thus the position could no longer be reliably determined. Since, for sensitivity reasons, the quality of the phase information should therefore be high, it is necessary, for correct phase measurement of the positioning signals, to match the filter 409 very precisely to the operating frequency of the positioning signal, for example, 125 kHz.

If the filter 409 were not matched to the operating frequency, the filter would change the phase of the positioning signal on the evaluation circuit 402, 406, whereby erroneous interpretations and incorrect coordinates of the position determination of the CPE 104 or GPE105 can occur. The resonance frequency of the filter could also be positioned near the operating frequency of the positioning signal. In this case, the phase would no longer be highly dependent on the component variances, but the filtering effect is no longer very good.

The component variance can be compensated in that the filter 409 is excited to oscillate by a pulse by the excitation device 410, and the phase measurement circuit 406 which is necessary in any case for the position determination is used in order to determine the resonance frequency, for example, by zero-crossing measurements. By connecting and/or disconnecting capacitors, the filter 409 can be matched so that the component tolerances are compensated.

Figure 10:
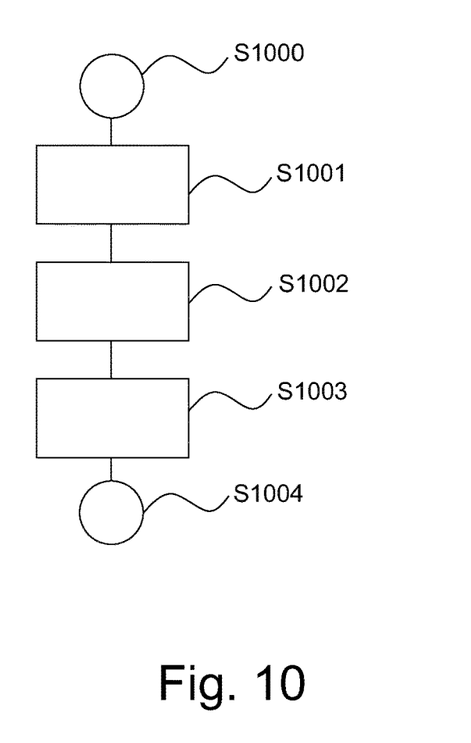
FIG. 10 shows a flowchart for a method for matching a matchable filter device of a signal matching device according to an example embodiment of the present invention.

FIG. 10 shows a flowchart for a method for matching a matchable filter device 409 of a signal matching device according to an example embodiment of the present invention.

Starting from an idle status S1000, in status S1001, an excitation of the matchable filter device 409 occurs by means of an excitation pulse, for example, a short direct current pulse, occurs. In status S1002, a measurement of a phase, for example, by the determination of the period and phase of the filter 409 with a phase measurement device 406 of the inductive energy transmission system, which is otherwise used, for example, for the evaluation of a positioning signal. In status S1003, a matching of the matchable filter device 409 occurs by the connection and/or disconnection of at least one capacitor and/or array of capacitors and/or inductances to or from the filter device 409. The method ends in the idle status S1004.

The connectable components can also be relocated or arranged in the evaluation unit 405 or can be implemented as separate components connectable via switches. Said connectable components can be connected, for example, parallel to Cp in FIG. 7.

In addition, it should be pointed out that "including" and "comprising" do not exclude other elements or steps and that "an" or "a" does not exclude the plural. Furthermore, it should be pointed out that features or steps described in reference to one of the above embodiment examples can also be used in combination with other features or steps of other

The invention claimed is:

1. A signal matching apparatus for an evaluation circuit to evaluate an electromagnetic signal for operation in an inductive energy transmission system, the apparatus comprising:
   a signal transmission device comprising:
      an antenna connection connected to a receiving antenna, the antenna connection configured to receive the electromagnetic signal from the receiving antenna, the electromagnetic signal having an amplitude and a phase;
      a damping device connected to the antenna connection, the damping device configured to dampen the electromagnetic signal so as to match the amplitude to a characteristic prescribable by the evaluation circuit, wherein damping affects the phase of the electromagnetic signal;
      a matchable filter device connected to the dampening device, the matchable filter device having a structure configured to connect and/or disconnect one or more capacitance and/or inductance components so as to match the phase affected by the damping of the electromagnetic signal by the damping device to the phase of the electromagnetic signal as received by the antenna connection, such that the phase of the electromagnetic signal remains substantially unchanged; and
      an evaluation connection connected to the matchable filter device and the evaluation circuit, the evaluation connection configured to provide the electromagnetic signal as damped and matched from the matchable filter device to the evaluation circuit for evaluation.

2. The signal matching apparatus according to claim 1, wherein the signal transmission device comprises a surge protection device connected between the antenna connection and the damping device, the surge protection device being matched to an operating frequency of the inductive energy transmission system, in order to bleed off a high voltage generated by the inductive energy transmission system.

3. The signal matching apparatus according to claim 1, wherein the damping device is further configured to form a voltage divider with a surge protection device, the surge protection device connected between the antenna connection and the damping device.

4. The signal matching apparatus according to claim 3, wherein the damping device is switchable between a near-field characteristic and a far-field characteristic of the electromagnetic signal.

5. The signal matching apparatus according to claim 3, wherein the damping device comprises a capacitive damping element.

6. The signal matching apparatus according to claim 5, wherein the capacitive damping element together with a surge protection device forms a capacitive voltage divider and/or a capacitive damping element.

7. The signal apparatus according to claim 3, wherein the damping device is configured to dampen signals that are above and/or below the frequency of the electromagnetic signal more strongly than signals that are at the frequency of the electromagnetic signal.

8. The signal matching apparatus according to claim 1, wherein the matchable filter device is further configured to compensate for a deviation of the components in the filter structure of the matchable filter device.

9. The signal matching apparatus according to claim 8, wherein the matchable filter device to match the phase and/or to compensate for the deviation of the components uses a phase measuring device of the energy transmission system.

10. The signal matching apparatus according to claim 1, wherein the electromagnetic signal is a positioning signal.

11. The signal matching apparatus according to claim 1, wherein the evaluation circuit is configured to evaluate the amplitude and/or the phase of the electromagnetic signal as damped and matched.

12. The signal matching apparatus according to claim 9, wherein phase measuring device is a zero-crossing measurement device.

13. The signal matching apparatus according to claim 10, wherein the positioning signal is a keyless entry system signal.

* * * * *